C. A. GUY. 3 Sheets—Sheet 1.
Assignor of one-fiftieth of his right to H. LEE.
Plate Printing Machines.
No. 9,317. Reissued July 20, 1880.
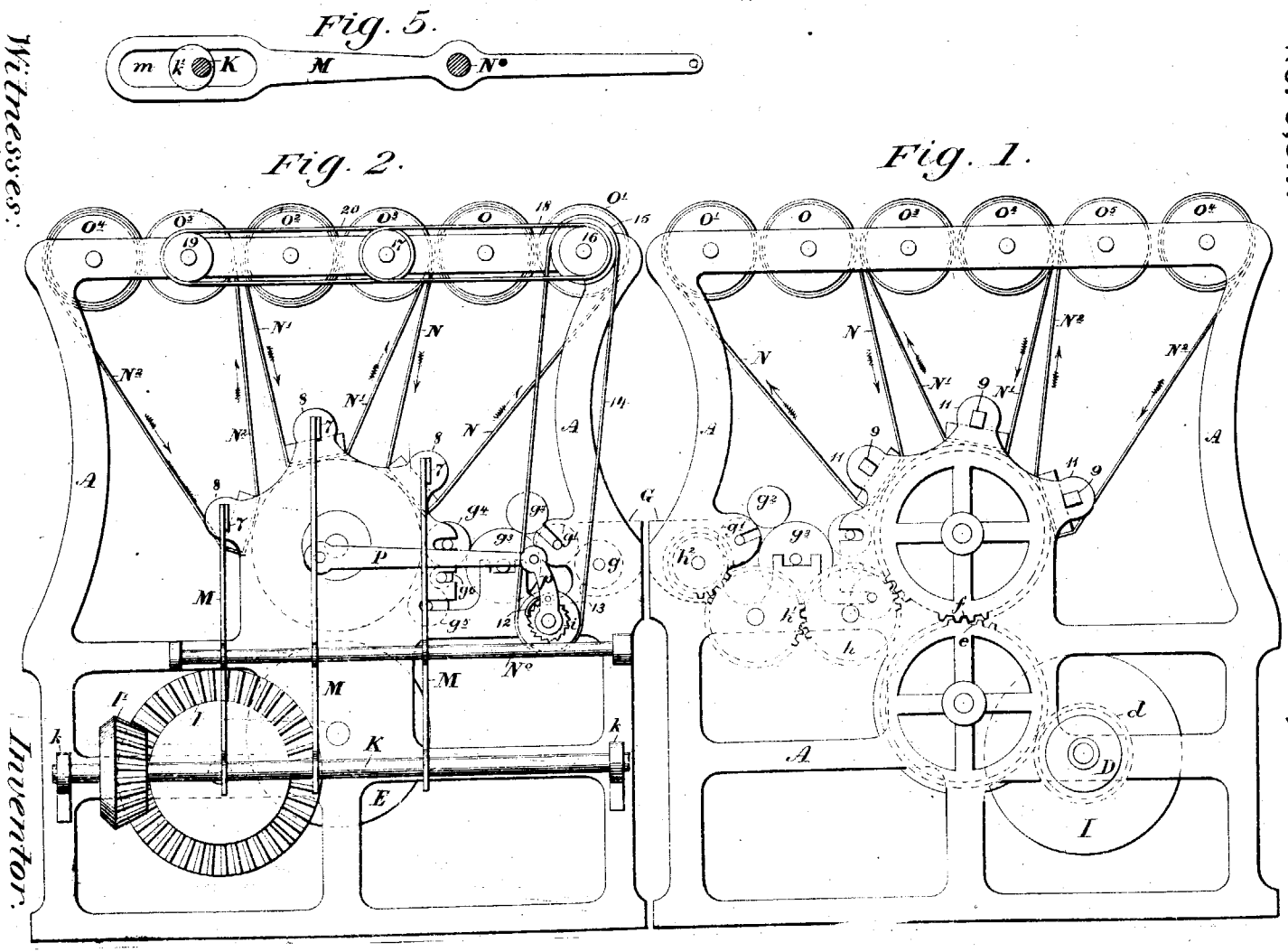
Witnesses:
Geo. H. Graham
Homer Lee
Inventor.
Constant Alexis Guy,
by Munson & Philipp
Attys.

C. A. GUY. 3 Sheets—Sheet 2.

Assignor of one-fiftieth of his right to H. LEE.

Plate Printing Machines.

No. 9,317. Reissued July 20, 1880.

Witnesses:
Geo. N. Graham
Homer Lee

Inventor.
Constant Alexis Guy,
by Munson & Philipp,
Atts.

C. A. GUY. 3 Sheets—Sheet 3.

Assignor of one-fiftieth of his right to H. LEE.

Plate Printing Machines.

No. 9,317. Reissued July 20, 1880.

Witnesses

F. S. Blanchard

Alex. Scott

Inventor:

Constant Alexis Guy, by Munson & Philipp attys.

UNITED STATES PATENT OFFICE.

CONSTANT A. GUY, OF PARIS, FRANCE, ASSIGNOR OF ONE-FIFTIETH OF HIS RIGHT TO HOMER LEE, OF NEW YORK, N. Y.

PLATE-PRINTING MACHINE.

SPECIFICATION forming part of Reissued Letters Patent No. 3,317, dated July 20, 1880.

Original No. 210,116, dated November 19, 1878. Application for reissue filed June 25, 1880. Patented in England August 15, 1876.

*To all whom it may concern:*

Be it known that I, CONSTANT ALEXIS GUY, a citizen of the Republic of France, residing in the city of Paris, Department of the Seine, have invented new and useful Improvements in Printing-Machines, of which the following is a specification.

My invention consists in the application of one or more wiper-cloths and the mechanism for operating the same to printing-presses especially adapted for printing from plates or engraved surfaces, as fully hereinafter described and claimed.

Figure 4:
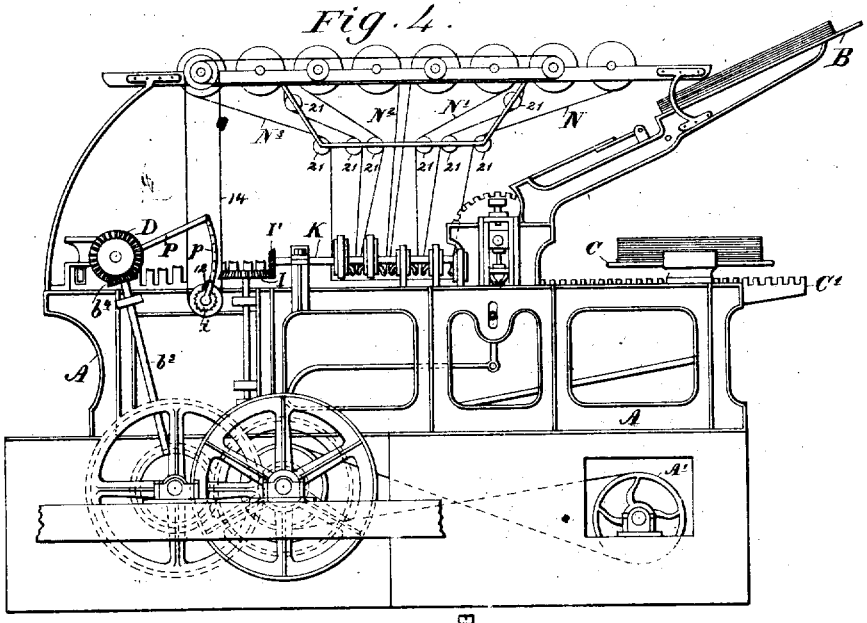
Figure 3:
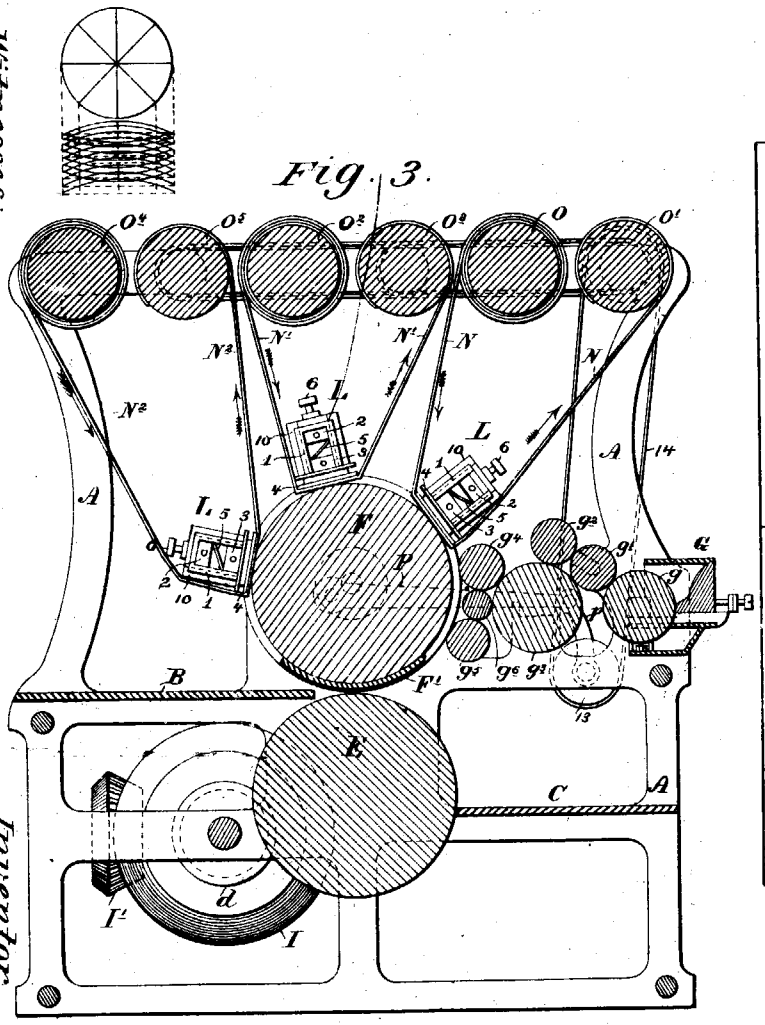
Figure 8:
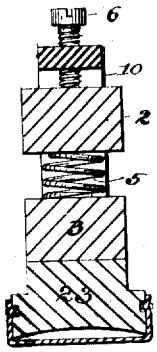
Figure 6:
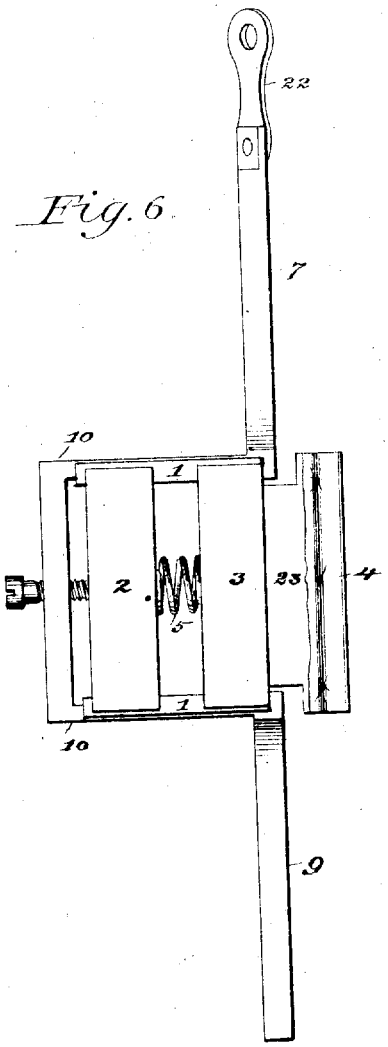
Figure 7:
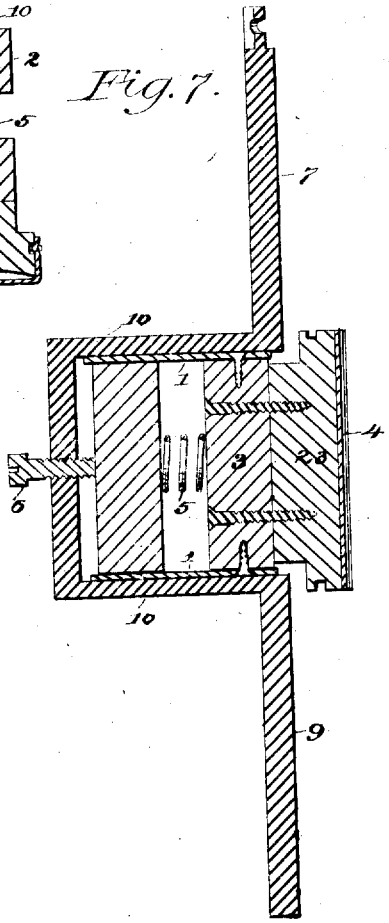

In the drawings accompanying and forming a part of this specification, Figures 1 and 2 are opposite side elevations, and Fig. 3 a vertical longitudinal section, of a cylinder-press with my improvements applied. Fig. 4 shows the application of said improvements to a printing-press having a horizontally-reciprocating bed; and Fig. 5 is a side view of the lever and its shafts for reciprocating the wipers, said shafts being in section. Fig. 6 represents a side elevation of one of the reciprocating carriers and the arms by which it is sustained in its bearings, Fig. 7 being a longitudinal sectional elevation of the same, and Fig. 8 a transverse sectional elevation.

In the art of plate-printing it is well known that in the wiping of the plates a certain movement is imparted to the wiper which is neither circular nor rectilinear, but is a compound curvilinear motion, reciprocating in the direction of the length and width of the plate, and it is also well known that the wipers employed, in order to perform good work, must be frequently changed.

To obtain the compound movement above referred to, which is essential in this style of printing, I preferably employ a printing-cylinder, upon which the printing-plate or engraved surface is fixed; and to avoid the frequent change of wipers I employ one or more traveling wipers of any desired length, each moving from one roller, under a flexible pad supported in a reciprocating carrier, over the printing-plates or engraved surfaces, and from thence to and around a second roller, upon which it is wound.

The flexible pad, with which each of the carriers is provided, is made of felt, waste-cotton, or similar soft and yielding substance, and the pressure of said pad upon the wiper-cloth (hence the pressure of the latter upon the plate or printing-surface) may be regulated at will.

In the accompanying drawings, A represents the main frame, constructed of any suitable material and of such appropriate form as to receive the operating mechanism. B is the feeding-table, and C the delivery-table. D is a driving-pulley carrying a pinion, *d*, which communicates motion to the impression-cylinder E by means of the cog-wheel *e*, mounted upon the shaft of said roller. The cog-wheel *e* gears with a cog-wheel, *f*, mounted upon the shaft of the printing-cylinder F, which carries the engraved plate or printing-surface F′.

G is the ink-fountain, and *g* the roller which transmits ink to a series of distributing-rolls, $g' g^2 g^3$, the latter of which transfers the ink to the form-rolls $g^4 g^5 g^6$, which ink the plate F′ as it is brought in contact therewith by the revolution of the cylinder F. The inking mechanism is operated from the same driving-shaft and pulley D by means of the cog-wheel *h*, meshing into cog-wheel *f*, and pinions $h' h^2$, the latter of which is on the fountain-roller shaft, as shown by Fig. 1.

I is a bevel-wheel mounted on the main driving-shaft on the end opposite to that of pulley D. Said wheel I meshes with a bevel-pinion, I′, mounted upon a counter-shaft, K, which lies longitudinally of and has its bearings *k k* in the side frame of the machine. (See Fig. 2.)

L L are reciprocating carriers or wiper-cages, (see Figs. 6 to 8,) each of which is composed of a frame, 10, provided with grooves or bearings which guide a sliding frame, 1, carrying the blocks 2 3. To the last-named blocks or to a plate or support, 23, connected therewith, are fixed one or more layers of felt, rubber, waste-cotton, or similar yielding material, constituting a flexible pad.

6 is a set-screw tapped through the frame 1, and 5 is a spring placed between the blocks 2 3, so that when the set-screw is screwed down the sliding frame 1 and blocks 2 3 will be correspondingly depressed, and with them the flexible pad, over which the wiping-cloth passes, to regulate the pressure of the wiping-cloth upon the plate F′.

7 and 9 are arms attached at opposite ends of the reciprocating carriers or wiper-cages L, which said arms slide freely in bearings 8 and 11, provided in the opposite side frames.

M M are levers pivoted to the outer ends of the arms 7, or to links 22, connecting therewith. Said levers have their fulcra upon the shaft $N^0$, arranged upon the side of the frame A. The lower ends of the levers M are forked and straddle the shaft K; or the lower ends may be slotted, as shown at *m*, Fig. 5, and in the slots or forks of the levers work the eccentrics or cams *k' k'*, by means of which the arms 7 and the reciprocating carriers or wiper-cages L are reciprocated, and with each of the latter a flexible pad and a wiper-cloth, as will be readily understood.

It will be seen that by this arrangement each reciprocating carrier or wiper-cage is not only made to reciprocate through its flexible pad a wiper-cloth upon the printing-plate or engraved surface on the revolving cylinder on a line at right angles to the revolution of said cylinder, but also serves to regulate the pressure of the wiper-cloth upon the plate on the cylinder, while the flexible pad with which it is provided insures the proper contact of the cloth with the plate.

N $N'$ $N^2$ are wiper-cloths, of any desired length and of suitable material, and O $O'$, $O^2$ $O^3$, and $O^4$ $O^5$, are rollers arranged in pairs, upon which the wiping-cloths are carried. One end of each cloth is made fast to one roller, and the other end to the second roller, of a pair, the bulk of the cloth being wound upon one of the rollers of each pair, as follows: Referring to Fig. 2, the cloth N is wound upon roller O and travels in the direction of the arrow to wind upon roller $O'$. The cloth $N'$ is wound upon roller $O^2$, and winds upon roller $O^3$, while cloth $N^2$ winds from roller $O^4$ onto roller $O^5$, all in the direction of the arrows, and each passing under the flexible pad of the reciprocating carrier or wiper-cage L. These rollers are operated as follows: P is a rod connecting a crank upon the outer end of the shaft of the printing-cylinder F with one end of a lever, *p*, the other end of which lever is loosely mounted upon the shaft of a ratchet-wheel, *i*. The lever carries a pawl, 12, which takes into the teeth of the ratchet-wheel *i*, and the shaft of the latter carries a sprocket-wheel or belt-pulley, 13, which is connected by a chain or belt, 14, to a sprocket-wheel or belt-pulley, 15, upon the shaft of roller $O'$. This shaft carries a second sprocket wheel or belt-pulley, 16, by which motion is communicated to the roller $O^3$. The shaft of roller $O^3$ carries a belt-pulley or sprocket-wheel, 17, over which a belt or chain, 18, runs to the wheel 16 and a second belt-pulley or sprocket-wheel, which latter communicates motion to roller $O^5$ through sprocket-wheel or belt-pulley 19, upon the shaft of the latter roller and a belt or chain, 20.

By means of the above-described arrangement of gearing the rod P, at every revolution of the printing-cylinder F, will carry the lever *p* and pawl 12 back a certain number of teeth upon the ratchet-wheel *i*, and then forward. In the latter movement the pawl 12, taking in one of the teeth, will move the ratchet around a corresponding distance and communicate this motion to the rollers $O'$ $O^3$ $O^5$, which will cause the wiper-cloths N $N'$ $N^2$ to wind upon said rollers.

It will be readily seen that, by changing the throw of the rod P, as well as the number of teeth on the ratchet-wheel 12, the wiper-cloths may be moved any desired distance at each revolution of the printing-cylinder F, or they may be moved a given distance for every given number of revolutions of the printing-cylinder.

Supposing, for example, that each of the wiping-cloths N $N'$ $N^2$ is of a length equal to one hundred meters, and that the intermittent motion thereof is equal to a distance of ten millimeters for every impression taken, it will therefore be seen that ten thousand impressions may be taken before it becomes necessary to change the wiper-cloths.

The above number of impressions may, however, be doubled or trebled before it becomes necessary to change the wiper-cloths, by gearing the latter to move one-half or one-third that distance for each impression, or even a less distance for every such impression.

By varying the size or diameter of the cylinders F E the former may be made to carry two or more engraved plates, by means of which a number of impressions, corresponding with the number of plates employed, may be taken at every revolution of the printing-cylinder.

In Fig. 4 I have shown the application of the wipers in combination with a moving table or flat bed, the form illustrated being a reciprocating table or bed. These wiper-cloths are operated in substantially the same manner as those illustrated in Figs. 1, 2, and 3, as shown in Fig. 4 of the drawings.

A' is the driving-shaft, which carries a pulley belted to the driving-pulley, which, through proper mechanisms, actuates the various moving parts of the machine. The shaft $b^2$ has a bevel-wheel, $b^1$, on its upper end, meshing with a bevel-wheel, D, which actuates the inking mechanisms; also the lever *p*, which latter operates the wiper-cloths N $N'$ $N^2$ $N^3$, which are held in proper position relatively to the reciprocating carriers or wiper-cages by means of a series of rolls, 21; and K is the shaft which actuates the carriers, their pads, and wiper-cloths in the way hereinbefore described.

In the printing from copper-plates I prefer to fix them upon a printing-cylinder instead of upon a flat table, as by the former method I am enabled to more perfectly obtain that compound movement of wiping illustrated in diagram, Sheet 2 of the drawings, which is so essential to the obtaining of perfect prints from such plates.

It will be understood that I do not wish to limit myself to any particular number of wipers, or to the length and material of the same, as they may be varied, not only according to the size of the machine in combination with which they are employed, but also according to the kind of printing to be done and the size of the plate from which the impressions are taken.

Having now described my invention, what I claim, and desire to secure by Letters Patent, is—

1. The combination, with the printing cylinder or table carrying the plate or printing-surface from which the impressions are taken, of one or more flexible pads, one or more moving wiper-cloths, and means to reciprocate the flexible pad or pads and wiper cloth or cloths laterally upon the plate or printing-surface, all substantially as described.

2. The combination of one or more flexible pads, each carried by a reciprocating carrier, one or more moving wiper-cloths, means to reciprocate each carrier with its pad and wiper-cloth laterally and to regulate the pressure of the latter upon the plate or printing-surface to insure proper contact between said cloth and plate or printing-surface, all substantially as described.

3. The combination of one or more flexible pads, each elastically seated in a reciprocating carrier, one or more wiper-cloths, means to reciprocate each carrier with its pad and wiper-cloth laterally and to regulate the pressure of the latter upon the plate or printing-surface to insure proper contact between said cloth ~~and plate or~~ printing-surface, all substantially as described.

4. The combination, with a printing cylinder or table carrying the plate or printing-surface from which the impressions are taken, of one or more flexible pads, each carried by a reciprocating carrier, one or more wiper-cloths, means to reciprocate each carrier with its pad and wiper-cloth laterally and to regulate the pressure of the latter upon the plate or printing-surface, and means for unwinding each wiper-cloth from one roll and winding it upon another, all substantially as described.

5. The combination, with a printing cylinder or table carrying the plate or printing-surface from which the impressions are taken and an inking mechanism, of one or more flexible pads, each carried by a reciprocating carrier, one or more wiper-cloths, means to reciprocate each carrier with its pad and wiper-cloth laterally and to regulate the pressure of the latter upon the plate or printing-surface, and means for unwinding each wiper-cloth from one roll and winding it upon another, all substantially as described.

6. The combination, with one or more carriers and one or more wiping-cloths, of one or more arms, as 7, and levers, as M, and the rotating shaft K, substantially as described.

7. The combination, with one or more carriers, one or more wiping-cloths, as N N′ $N^2$, and means to reciprocate each carrier, with its wiper-cloth, of pairs of rollers, as O O′ $O^2$ $O^3$ $O^4$ $O^5$, pulleys and belt to drive one roller of each pair, belt 14, pulley 13, ratchet-wheel *i*, pawl 12, rod *p*, and lever P, whereby said wiper-cloths are moved onward, all substantially as described.

8. The combination of the printing cylinder or table carrying the plate or printing-surface from which the impressions are taken, an inking mechanism, one or more carriers, each supporting a wiper-cloth, and the mechanism for reciprocating the carriers and cloths, with the main driving-shaft and pulley D, pinion *d*, cog-wheels *e f* I I′, to operate the whole mechanism from one driving-shaft, all substantially as described.

In witness that I claim the foregoing I have hereunto set my hand this 19th day of May, 1880.

CONSTANT ALEXIS GUY.

Witnesses:
R. A. BUISMAN,
HOMER LEE.